United States Patent
Johnson et al.

(10) Patent No.: US 9,172,481 B2
(45) Date of Patent: Oct. 27, 2015

(54) AUTOMATIC MULTI-GENERATIONAL DATA CACHING AND RECOVERY

(71) Applicants: Jeffrey L. Johnson, West Fargo, ND (US); Nicholas L. Butts, West Fargo, ND (US)

(72) Inventors: Jeffrey L. Johnson, West Fargo, ND (US); Nicholas L. Butts, West Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 13/946,826

(22) Filed: Jul. 19, 2013

(65) Prior Publication Data

US 2014/0024395 A1    Jan. 23, 2014

Related U.S. Application Data

(60) Provisional application No. 61/674,216, filed on Jul. 20, 2012.

(51) Int. Cl.
| | |
|---|---|
| *H04H 60/27* | (2008.01) |
| *H04W 4/02* | (2009.01) |
| *H04W 4/00* | (2009.01) |
| *G08G 5/00* | (2006.01) |
| *H04N 21/40* | (2011.01) |

(52) U.S. Cl.
CPC .......... *H04H 60/27* (2013.01); *G08G 5/0021* (2013.01); *H04W 4/00* (2013.01); *H04W 4/02* (2013.01); *G08G 5/0017* (2013.01); *H04N 21/40* (2013.01)

(58) Field of Classification Search
None
See application file for complete search history.

(56) References Cited

U.S. PATENT DOCUMENTS

| | | | |
|---|---|---|---|
| 2,975,671 A | | 3/1961 | Hemstreet |
| 3,050,870 A | | 8/1962 | Helig |
| 3,081,557 A | | 3/1963 | Mailhot |
| 3,631,496 A | * | 12/1971 | Fink et al. .................. 342/444 |
| 3,784,969 A | | 1/1974 | Wilckens et al. |
| 4,226,491 A | | 10/1980 | Kazama |
| 4,263,726 A | | 4/1981 | Bolton |
| 4,276,029 A | | 6/1981 | Gilson et al. |
| 4,380,024 A | | 4/1983 | Olofsson |
| 4,442,491 A | | 4/1984 | Olhausen |
| 4,470,116 A | | 9/1984 | Ratchford |

(Continued)

FOREIGN PATENT DOCUMENTS

| | | |
|---|---|---|
| CA | 2305633 | 10/2001 |
| EP | 0445270 | 10/1992 |

(Continued)

OTHER PUBLICATIONS

Wynbrandt, James. "SkyVision Xtreme." Plane and Pilot 07 2011: 54-5. ProQuest. Web. Nov. 5, 2014.*

(Continued)

*Primary Examiner* — Lester Kincaid
*Assistant Examiner* — Daniel G Bassett
(74) *Attorney, Agent, or Firm* — Jonathan L. Tolstedt; Mark E. Brown

(57) ABSTRACT

An electronic system comprising a receiver module and a mobile device, whereby the receiver module is capable of receiving data transmissions from a network of ground stations and buffering the data for future use, and whereby the receiver module provides a means for making requests for access to this buffered data, and the mobile device is capable of generating requests to the receiver module in order to access the buffered data and of displaying the data or playing the data to an operator.

3 Claims, 10 Drawing Sheets

(56) References Cited

U.S. PATENT DOCUMENTS

| | | |
|---|---|---|
| 4,527,980 A | 7/1985 | Miller |
| 4,644,494 A | 2/1987 | Muller |
| 4,694,119 A | 9/1987 | Groenewegen |
| 4,740,779 A | 4/1988 | Cleary et al. |
| 4,855,822 A | 8/1989 | Narendra et al. |
| 4,944,401 A | 7/1990 | Groenewegen |
| 5,123,538 A | 6/1992 | Groenewegen |
| 5,173,856 A | 12/1992 | Purnell et al. |
| 5,240,207 A | 8/1993 | Eiband et al. |
| 5,261,820 A | 11/1993 | Slye et al. |
| 5,272,652 A | 12/1993 | Rosenshein et al. |
| 5,438,162 A | 8/1995 | Thompson et al. |
| 5,594,286 A | 1/1997 | Tachikawa |
| 5,742,336 A | 4/1998 | Lee |
| 5,750,925 A | 5/1998 | Purdom |
| 5,756,934 A | 5/1998 | Purdom |
| 5,826,206 A | 10/1998 | Nemeth |
| 5,865,624 A | 2/1999 | Hayashigawa |
| 6,052,792 A | 4/2000 | Mensch |
| 6,126,449 A | 10/2000 | Burns |
| 6,148,179 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,219,618 B1 | 4/2001 | Bateman |
| 6,345,232 B1 | 2/2002 | Lynch et al. |
| 6,353,734 B1 | 3/2002 | Wright et al. |
| 6,389,333 B1 | 5/2002 | Hansman et al. |
| 6,397,128 B1 | 5/2002 | Todd |
| 6,415,227 B1 | 7/2002 | Lin |
| 6,473,676 B2 | 10/2002 | Katz et al. |
| 6,480,152 B2 | 11/2002 | Lin et al. |
| D470,450 S | 2/2003 | Olzak |
| 6,634,885 B2 | 10/2003 | Hodgetts et al. |
| 6,671,648 B2 | 12/2003 | McCall et al. |
| 6,678,588 B2 | 1/2004 | He |
| 6,690,338 B1 | 2/2004 | Maguire |
| 6,721,640 B2 | 4/2004 | Glenn et al. |
| 6,762,942 B1 | 7/2004 | Smith |
| 6,792,353 B2 | 9/2004 | Lin |
| 6,816,715 B1 * | 11/2004 | Mano ..................... 455/161.3 |
| 6,822,161 B2 | 11/2004 | Komatsu et al. |
| 6,822,624 B2 | 11/2004 | Naimer et al. |
| 6,867,367 B2 | 3/2005 | Zimmerman |
| 6,879,875 B1 | 4/2005 | Hu et al. |
| 6,885,971 B2 | 4/2005 | Vock et al. |
| 6,898,492 B2 | 5/2005 | de Leon et al. |
| 6,915,206 B2 | 7/2005 | Sasajima |
| 7,020,708 B2 | 3/2006 | Nelson et al. |
| 7,023,695 B2 | 4/2006 | McCollum et al. |
| 7,117,135 B2 | 10/2006 | Cull et al. |
| 7,177,939 B2 | 2/2007 | Nelson et al. |
| 7,203,630 B2 | 4/2007 | Kolb et al. |
| 7,333,343 B2 | 2/2008 | Olzak |
| 7,356,389 B2 | 4/2008 | Holst et al. |
| 7,375,678 B2 | 5/2008 | Feyereisen et al. |
| 7,386,376 B2 | 6/2008 | Basir et al. |
| 7,624,943 B2 | 12/2009 | Cerchie et al. |
| 7,742,080 B2 | 6/2010 | Nakajima |
| 7,848,698 B2 | 12/2010 | Batcheller et al. |
| 7,881,914 B2 | 2/2011 | Trotta et al. |
| 8,081,921 B2 | 12/2011 | Batcheller et al. |
| 8,265,542 B2 | 9/2012 | Batcheller et al. |
| 8,355,834 B2 | 1/2013 | Duggan et al. |
| 2001/0036868 A1 | 11/2001 | Roy et al. |
| 2002/0035416 A1 | 3/2002 | De Leon |
| 2002/0093564 A1 | 7/2002 | Israel |
| 2003/0195672 A1 | 10/2003 | He |
| 2003/0225492 A1 | 12/2003 | Cope et al. |
| 2004/0054512 A1 | 3/2004 | Kim et al. |
| 2004/0224740 A1 | 11/2004 | Ball et al. |
| 2005/0114627 A1 | 5/2005 | Budny et al. |
| 2005/0220055 A1 | 10/2005 | Nelson et al. |
| 2005/0246353 A1 | 11/2005 | Ezer et al. |
| 2006/0057974 A1 | 3/2006 | Ziarno et al. |
| 2006/0176651 A1 | 8/2006 | Olzak |
| 2006/0216674 A1 | 9/2006 | Baranov et al. |
| 2006/0227995 A1 | 10/2006 | Spatharis |
| 2007/0020588 A1 | 1/2007 | Batcheller et al. |
| 2007/0100516 A1 | 5/2007 | Olzak |
| 2009/0147758 A1 * | 6/2009 | Kumar ..................... 370/338 |
| 2010/0092926 A1 | 4/2010 | Fabling |
| 2010/0149329 A1 | 6/2010 | Maguire |
| 2010/0231706 A1 | 9/2010 | Maguire |
| 2012/0215505 A1 | 8/2012 | Srivastav et al. |
| 2012/0299752 A1 * | 11/2012 | Mahmoud et al. ............ 340/972 |
| 2013/0137415 A1 * | 5/2013 | Takikawa ...................... 455/418 |
| 2013/0171964 A1 * | 7/2013 | Bhatia et al. .................. 455/411 |

FOREIGN PATENT DOCUMENTS

| | | |
|---|---|---|
| EP | 1053290 | 3/2003 |
| WO | WO-8503583 | 8/1985 |
| WO | WO-9104525 | 4/1991 |
| WO | WO-9104921 | 4/1991 |
| WO | WO-2004045106 | 5/2004 |
| WO | WO-2005031272 | 4/2005 |
| WO | WO-2005053524 | 6/2005 |
| WO | WO-2005053528 | 6/2005 |
| WO | WO-2007046831 | 4/2007 |

OTHER PUBLICATIONS

Free In-Cockpit Weather No Subscription ADS-B / NextGen SkyVision Xtreme Video 3: SkyVisionXtreme's channel on YouTube [retrieved on Nov. 5, 2014, uploaded on Jun. 14, 2011]. Retrieved from the Internet: <URL: www.youtube.com/watch?v=32h-H3c9jOc>.*

"International Search Report", WO 2004/045106 International Search Report, PCT/CA03/01730,(Mar. 29, 2004).

SAGETECH. "Clarity/Clarity SV User Manual", available at http://www.sagetechcorp.com/client/Clarity%20User%20Manual.pdf, (2013), 1-24.

* cited by examiner

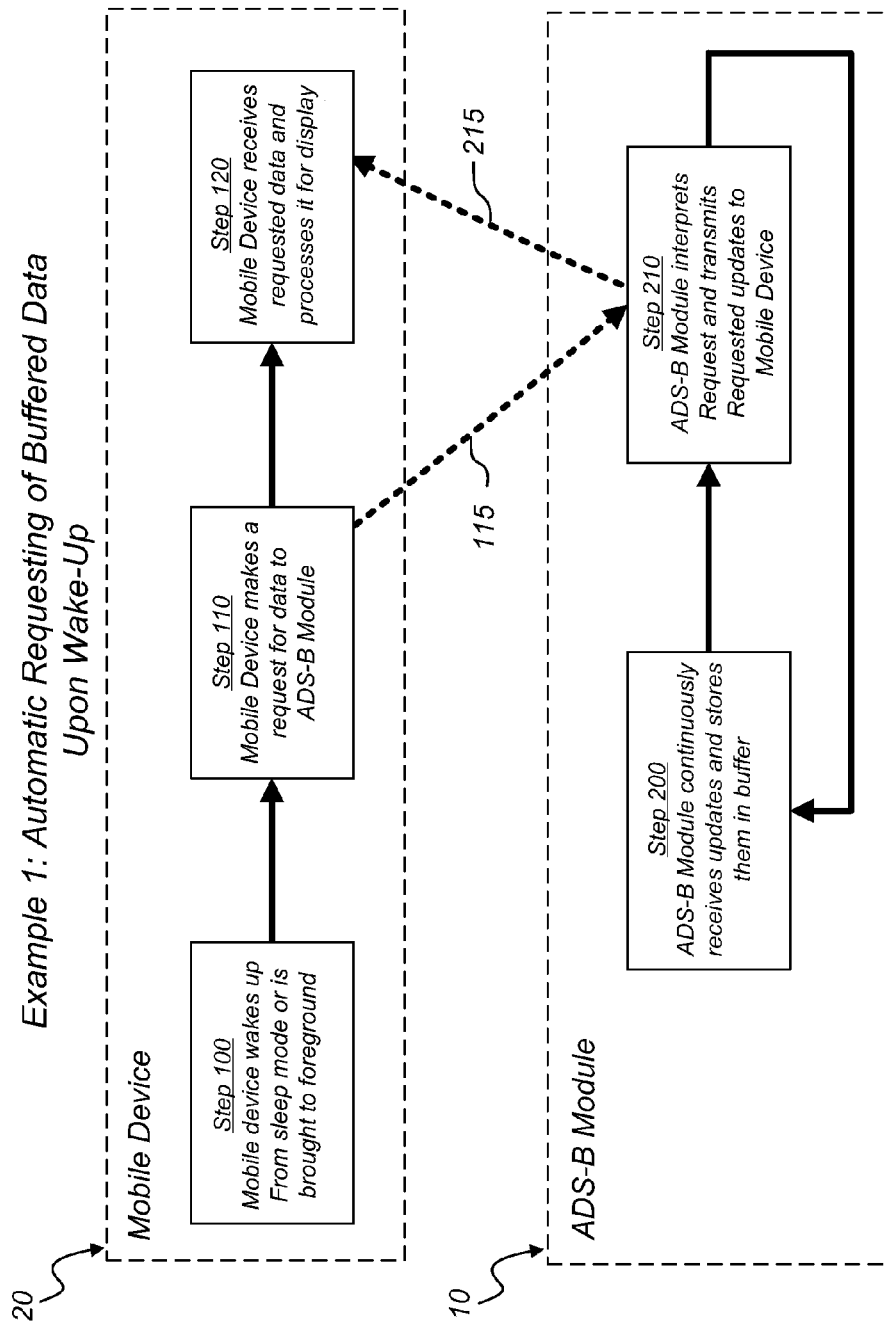

AUTOMATIC MULTI-GENERATIONAL DATA CACHING AND RECOVERY

CROSS REFERENCE TO RELATED APPLICATIONS

This patent application claims the benefit of U.S. Provisional Patent Application No. 61/674,216, entitled, "AUTOMATIC MULTI-GENERATIONAL DATA CACHING AND RECOVERY" by Johnson, filed on Jul. 20, 2012, which is incorporated herein by reference.

BACKGROUND OF THE INVENTION

1. Field of the Invention

The present invention relates generally to the field of aircraft tracking and information services, and more specifically to a system capable of receiving and processing transmissions from multiple aviation sources, including, but not limited to, automatic dependent surveillance-broadcast (ADS-B) towers, Very High Frequency Omni-Range (VOR) ground stations, and other aircraft.

2. Description of the Related Art

Automatic Dependent Surveillance-Broadcast, or ADS-B, is a surveillance technology for tracking aircraft that is part of the Next Generation (NextGen) Air Transportation System.

The system relies on two avionics components: a high-integrity GPS navigation source and a data link (ADS-B unit or receiver). There are several types of certified ADS-B data links, but the most common ones operate at 1090 MHz, essentially a modified Mode S transponder, or at 978 MHz (United States only).

ADS-B consists of two different services, "ADS-B Out" and "ADS-B In". "ADS-B Out" periodically broadcasts information about an aircraft, including identification, current position, altitude, and velocity, to the outside world, providing air traffic controllers with real-time position information typically more accurate than the information available with current radar-based systems. "ADS-B In" is the reception by aircraft of information including weather data, flight information, traffic avoidance information, and direct communication from nearby aircraft.

The ADS-B system can provide traffic and government generated graphical weather information through the TIS-B (Traffic Information Services-Broadcast) and FIS-B (Flight Information Services-Broadcast) applications.

The majority of aircraft operating within United States airspace will be required to be equipped with at least "ADS-B Out" by January of 2020. Because of this move toward the mandate of ADS-B equipped aircraft, it is seen as important to aviation electronics suppliers and pilots alike that an inexpensive, yet reliable system be available for implementation of the ADS-B functionality. Some suppliers are offering ADS-B solutions that interface with mobile computing devices such as an iPad, in order to provide a relatively inexpensive display for the system that is also capable of running applications and performing other tasks when not being used as an ADS-B display.

While using a mobile device such as an iPad is an innovative approach, the solution is not without its issues. Mobile devices run on battery power, and therefore often drop into "sleep" mode in order to conserve battery life. When the mobile device is in sleep mode, or when the ADS-B application (that is, the software application or program executing on the mobile device and performing the ADS-B functionality) is pushed into the background by another competing application running on the mobile device, the ADS-B application is likely not receiving broadcasts from the ADS-B system, and therefore may be missing important weather updates. When a pilot or other operator turns the mobile device on (or "wakes" it from sleep mode) to check the weather, he or she may have just missed a weather broadcast, or may have missed one almost 15 minutes earlier (the approximate broadcast rate of national weather updates), and so the weather display may be significantly out of date. The pilot could fly into inclement weather he or she cannot see on the erroneous (not updated) display.

What is needed in the art is a system that is capable of caching multiple generations of broadcast data (including but not limited to ADS-B weather broadcasts), providing access to those multiple generations of data or to a selected subset thereof to a mobile device upon request by the mobile device, a means for displaying the data or data subset on the mobile device either as still imagery or as an animation, and a means for automatically detecting when the mobile device has "awakened" or turned on and transmitting cached broadcast data to the mobile device upon wake up such that it is displayed in a usable manner.

BRIEF SUMMARY OF THE INVENTION

Accordingly, it is one objective of the present invention to describe an ADS-B system comprising a receiver module and a mobile device, whereby the receiver module is capable of receiving data transmissions from a network of ground stations and buffering the data for future use, and whereby the receiver module provides a means for making requests for access to this buffered data, and the mobile device is capable of generating calls to the receiver module in order to access the buffered data.

It is another objective of the present invention to describe an ADS-B system comprising a receiver module and a mobile device, whereby the receiver module is capable of receiving data transmissions from a network of ground stations and buffering the data for future use, and whereby the receiver module provides a means for making requests for access to this buffered data, and the mobile device generates calls to the receiver module in order to access any buffered data the mobile device may have missed after having been in a sleep mode or otherwise unavailable for the reception of data transmissions.

It is another object of the present invention to describe an ADS-B system comprising a receiver module and a mobile device, whereby the receiver module is capable of receiving data transmissions from a network of ground stations and buffering the data for future use, and whereby the receiver module provides a means for making requests for access to this buffered data, and the mobile device generates calls to the receiver module in order to access multiple generations of historic, buffered data such that the mobile device can build an animated weather display from the historic data.

It is yet another object of the present invention to describe an electronic data receiving system comprising a receiver module and a mobile device, whereby the receiver module is capable of receiving data transmissions from a plurality of broadcasting sources, including but not limited to ground stations and aircraft, and buffering the data for future use, and whereby the receiver module provides a means for making requests for access to this buffered data, and the mobile device generates calls to the receiver module in order to access multiple generations of historic, buffered data such that the mobile device can build an animated weather display from the historic data.

Further objectives and advantages of the invention will become apparent from a consideration of the drawings and ensuing description.

BRIEF DESCRIPTION OF THE DRAWINGS

FIG. 2 is a flowchart showing an example use of the ADS-B system wherein weather data stored in the ADS-B module is requested by a mobile device once the mobile device wakes up.

DETAILED DESCRIPTION OF THE PREFERRED EMBODIMENTS

Referring now to FIGS. 1A through 8, a new electronic data receiving system with automatic multi-generational data caching and recovery will be described.

Figure 1A:
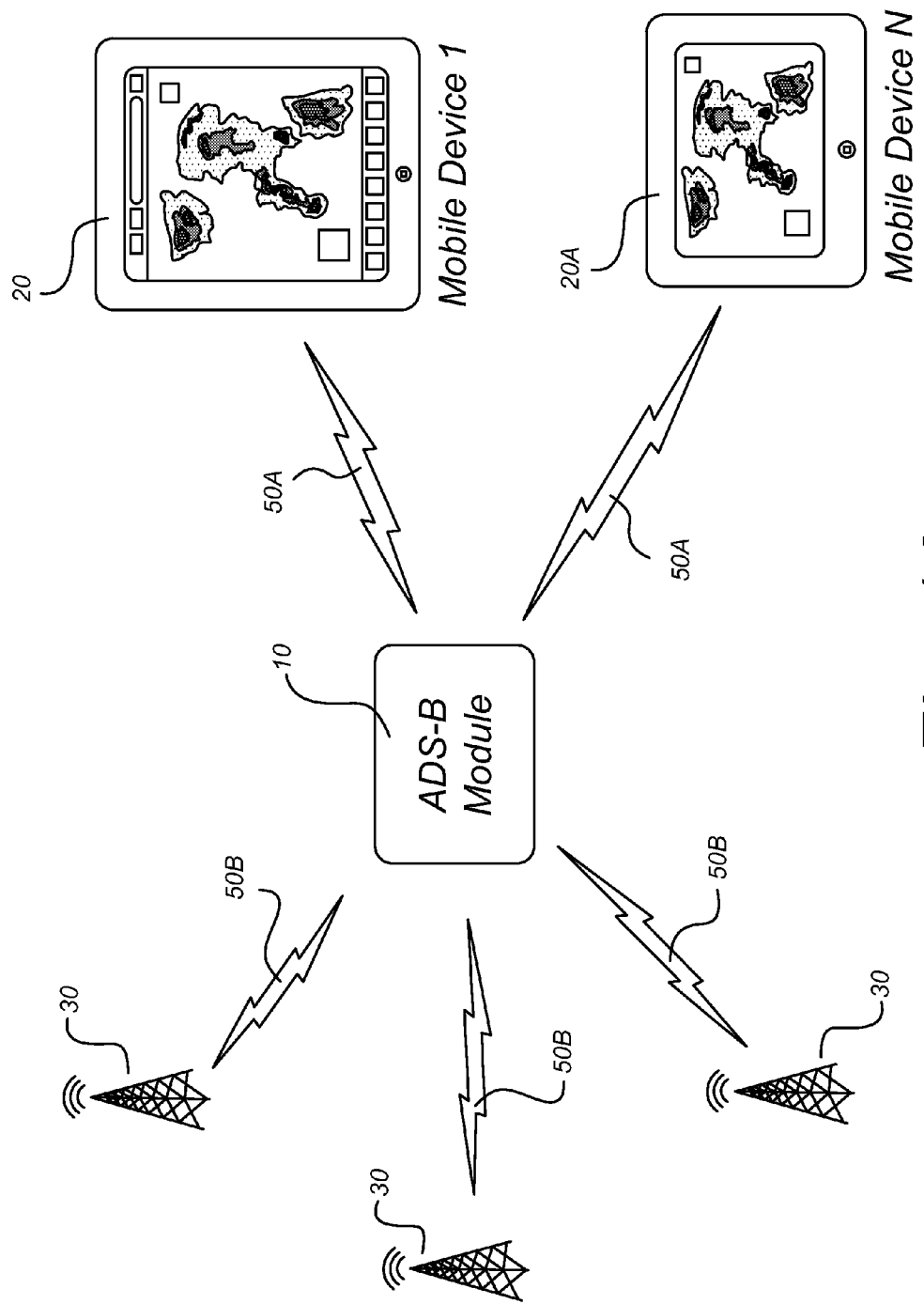
FIG. 1A is a block diagram of one embodiment of an ADS-B system as described herein, comprising an ADS-B module for receiving transmissions from ground stations and one or more mobile devices which can exchange data with the ADS-B module.

FIG. 1A is a block diagram of one embodiment of an ADS-B system as described herein, comprising an ADS-B module for receiving transmissions from ground stations and one or more mobile devices which can exchange data with the ADS-B module.

An ADS-B module 10 is mounted on a vehicle (not shown and not part of the invention) such as an aircraft. The ADS-B module 10 receives periodic data transmissions 50B from one or more ADS-B ground stations 30. Of significance to the present invention are the numerous weather products that are broadcast by the ADS-B ground stations 30, and which comprise the data transmissions 50B shown in FIG. 1. Several example weather products are listed in Table 1, along with their range and update interval. However, although the preferred embodiment of the invention and the examples shown deal with weather products, it should be noted that the present invention applies equally well to other types of data that may be transmitted periodically from ground stations or other sources (such as other aircraft, refer to FIG. 4), either at present or as may be done in the future.

TABLE 1

Example Weather Products Broadcast by ADS-B Ground Stations

| Weather Product | Range | Update Interval |
|---|---|---|
| NEXRAD Composite Reflectivity | Contiguous US 250 nautical miles (NM) | 15 minutes 2.5 minutes |
| AIRMETs (Airman's Meteorological Information) | 100 NM, airport surface 500 NU en route/terminal | 5 minutes |
| SIGMETs and Convective SIGMETs (Significant Meteorological Information) | 100 NM, airport surface 500 NU en route/terminal | 5 minutes |
| METARs (Meteorological Aviation Reports) | 100 NM, airport surface 500 NU en route/terminal | 5 minutes |
| NOTAM(D) and FDC NOTAM (Notice to Airmen, including TFR) | 100 NM | 10 minutes |
| PIREPs (Pilot Reports) | 500 NU en route/terminal | 10 minutes |
| Special Use Airspace | 500 NU en route/terminal | 10 minutes |
| TAF (Terminal Area Forecast) | 100 NM, airport surface 500 NU en route/terminal | 10 minutes |
| Wind/Temperature Aloft | 1000 NM | 10 minutes |

Figure 1B:
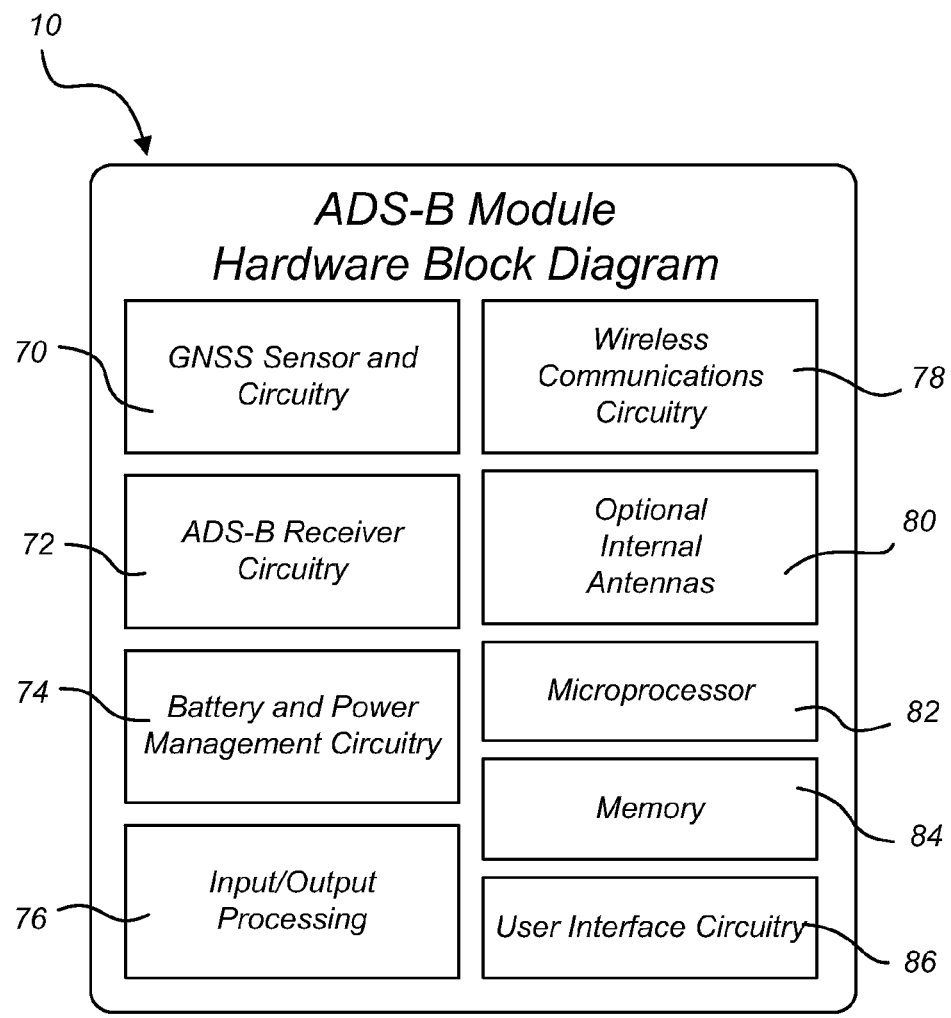
FIG. 1B is a high-level hardware block diagram of one embodiment of an ADS-B module for use with the present invention.

The weather products arriving in data transmissions 50B are received by ADS-B module 10 and stored in a buffer in memory inside the ADS-B module 10 (memory to be detailed in FIG. 1B).

The weather product information is stored in a memory buffer internal to the ADS-B module 10 such that multiple generations of transmitted weather data are available by request from an external module or user. This buffer may be implemented as a circular buffer, such that the last (most recent) N transmissions of weather data are held in the buffer, and when a new transmission is received (the N+1 transmission), the oldest transmission in memory is overwritten with the newest transmission, such that only the N most recent transmissions are ever stored in memory at a given time. In this embodiment, N is a variable representing a whole number which might be user-defined or otherwise programmed into the software of the ADS-B module 10.

For example, if N equals five, the ADS-B module 10 would hold the last five weather transmissions broadcast by the ADS-B ground stations 30 in memory. If a sixth weather product transmission is broadcast, then when it is received by the ADS-B module 10, the ADS-B module 10 will write it in memory overtop of the first (oldest) weather transmission received, so that only the last (most recent) five weather transmissions remain in memory.

Of course, the circular buffer is only one way of implementing a buffer algorithm, and any appropriate memory storage method may be implemented without varying from the intent of the invention. Also, it should be noted that, given a sufficiently large memory, it would be possible to store all possible weather transmissions for a given flight or series of flights (defining a "trip" taken by the aircraft), allowing the ADS-B module 10 to access any previous weather transmission received during that trip. This may, in fact, be the preferred method of memory storage, enabling the highest number of memory handling and accessing options. If, however, the system is receiving very large data transmissions, or the memory available is not adequate, a memory handling algorithm such as the one described above can be implemented by one skilled in the arts.

The ADS-B system of the present invention also employs one or more mobile devices (20 and 20A) as a display. In FIG. 1A, a mobile device 20 such as an iPad or any appropriate mobile computer, laptop, or handheld processing device is used as a display for the system. A software application (not shown in FIG. 1A but presented in FIG. 1C) running on the mobile device 20 displays flight charts, graphical weather displays, and other data screens to the user. The mobile device 20 receives the data used for this application over a wireless connection 50A. Using the wireless connection 50A, the mobile device 20 can send requests to the ADS-B module 10 for data, and the mobile device 20 can respond by sending the requested data back over the same wireless connection 50A. The wireless connection 50A may be an 802.11 standard connection or any other appropriate wireless connection data standard. (It should be noted that an alternate embodiment of this system could be implemented with a wired data connection between the ADS-B module 10 and the mobile device 20 without deviating from the intent of the present invention.)

Once the mobile device 20 receives information (including the stored weather information) from the ADS-B module 10, it can create a graphical display for the user. Because the mobile device 20 can request multiple generations of stored weather data from the ADS-B device 10, the mobile device 20 may use this historical data to update application graphics on a mobile device 20 that may have been in a sleep mode (and which therefore missed an important weather update), or it can use the generational data to create animated weather displays or historical weather displays. These scenarios are further described in FIGS. 2 and 3.

The ADS-B module 10 is designed to work with multiple mobile devices simultaneously. FIG. 1A shows a second mobile device 20A interfacing to the ADS-B module 10 over a similar wireless connection 50A to illustrate this point. It should be noted that it would be possible to have an embodiment of the present invention in which the wireless connection between one mobile device 20 and the ADS-B module 10 and the wireless connection between a second or third mobile device 20A and the ADS-B module 10 may be two separate communication protocol types. For instance, one mobile device 20 may communicate with the ADS-B module 10 using the 802.11g wireless standard, and a second mobile device 20A may communicated simultaneously with the ADS-B module 10 using the Bluetooth wireless standard. The wireless protocols mentioned here are for example only and are not meant to be limiting in any way.

In order to process requests and to interface with multiple mobile devices, the software on the ADS-B module 10 provides a means for making data requests. This is described in more detail in FIG. 1C.

FIG. 1B is a high-level hardware block diagram of one embodiment of an ADS-B module 10 for use with the present invention. One embodiment of an ADS-B module 10 for use in the present invention has a microprocessor 82 for controlling the overall module functioning and executing module firmware, and memory 84 for storing data such as multiple generations of weather products received from ADS-B ground stations 30 as previously described. In one embodiment, memory 84 may be non-volatile memory, which retains its contents should the power be removed from the memory 84. However, any appropriate type of memory may be used without deviating from the intent of the present invention.

The ADS-B module 10 also offers a global navigation satellite system (GNSS) sensor and associated circuitry 70 for determining the location of the module in three-dimensional space. An example of a GNSS system is the global positioning system (GPS) used in the United States and worldwide, featuring a system of geosynchronous orbiting satellites transmitting signals which can be received and used to triangulate a location and altitude at a point on the Earth. However, any appropriate GNSS system may be used in an alternate embodiment of the present invention. It should also be noted that a non-GNSS system may also be used without deviating from the inventive concept.

The ADS-B module 10 has an ADS-B transceiver circuit 72 for receiving data transmissions including (but not limited to) the weather products listed in Table 1. Optionally, this ADS-B circuitry could be designed such that it is also a transmitter, such that it can transmit location and other information to the ADS-B ground stations 30 or other mobile devices 20/20A.

Wireless communications circuitry 78 allows the ADS-B module 10 to communicate with mobile devices 20 and 20A, as well as stationary computers such as desktop computers and base stations. The wireless communications circuitry 78 may implement one or more of any appropriate wireless standards, including but not limited to 802.11, Bluetooth, and ZigBee. The ADS-B module 10 optionally includes internal antennas 80 for items such as the GNSS sensor/receiver 70, the wireless communications circuitry 78, and, optionally, ADS-B transmissions.

In one embodiment, the ADS-B module 10 provides input/output (I/O) processing circuitry 76 for dealing with analog and digital inputs and outputs to the module and USB and other types of connections, and user interface circuitry 86 for handling things like light emitting diodes (LEDs) for communicating with a user and for reading button presses or other types of user input.

Finally, the ADS-B module 10 of the example embodiment has an internal battery and power management circuitry 74. The circuitry is responsible for keeping the battery charged and for conditioning and distributing the power to the circuitry throughout the ADS-B module 10.

It should be noted that the example embodiment given in FIG. 1B may be modified without changing the intent of the present invention. In particular relevance to the remainder of this specification, it should be noted that the ADS-B module 10 may be replaced with any appropriate type of receiver circuitry. For example, as shown in the embodiment illustrated in FIGS. 4 through 8, the ADS-B module 10 can be replaced with a more generic radio frequency (RF) receiver module to create a system that can record any information transmitted by RF. In the example embodiment of FIGS. 4 through 8, a software-defined radio (SDR) module can listen into radio transmissions relevant to an aircraft (such as navigation, or NAV, and communication, or COM signals) to create a system which captures important aviation-related radio transmissions. This example is detailed later in this specification and in FIGS. 4 through 8.

Figure 1C:
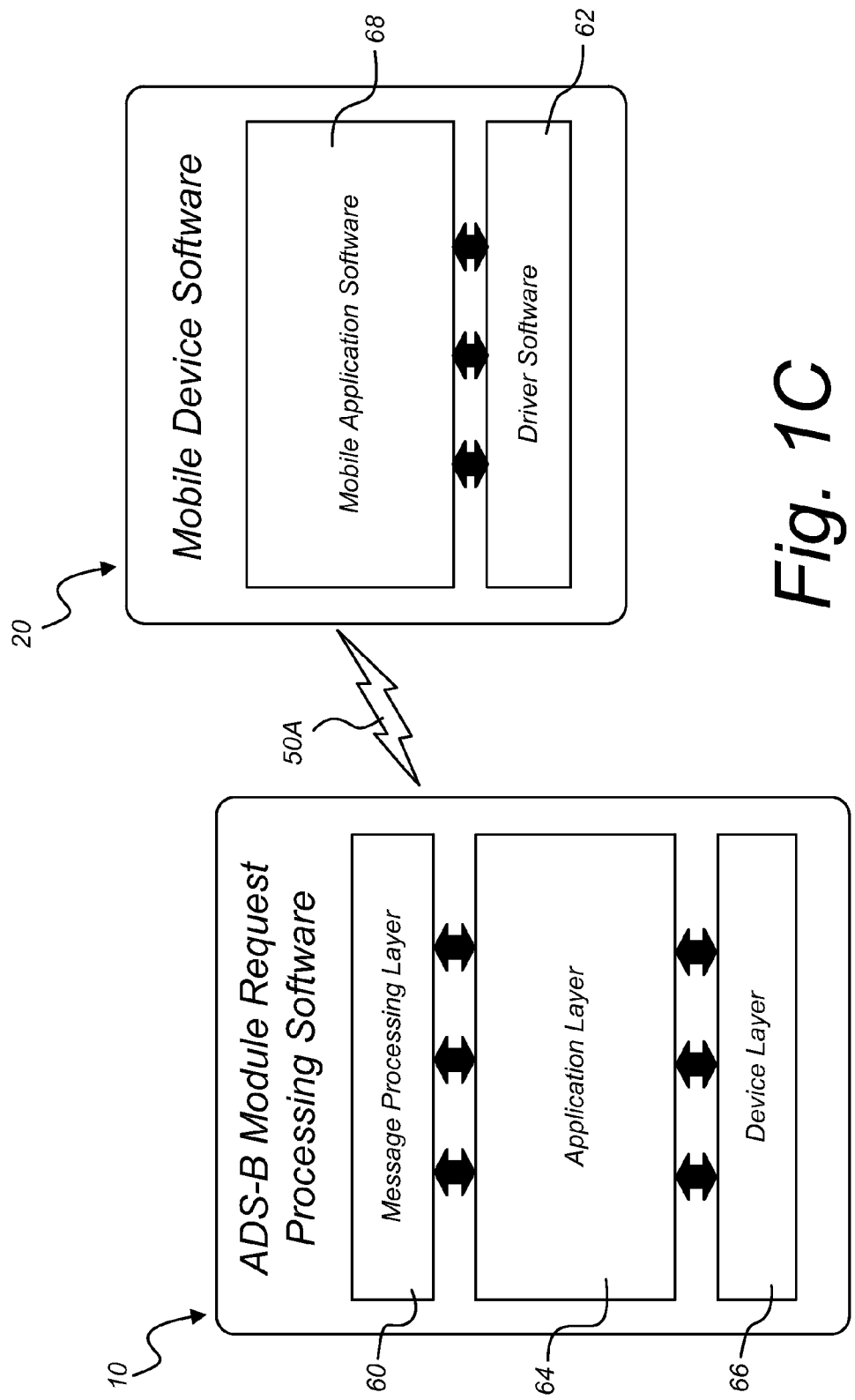
FIG. 1C is a high-level block diagram of one embodiment of a software architecture that could execute on the ADS-B module to process requests from a mobile device for updates on cached information.

FIG. 1C is a high-level block diagram of one embodiment of software that could execute on the ADS-B module to process requests from a mobile device for updates on weather and other cached information. This is a very high-level diagram and is provided primarily to show that one embodiment of a software architecture that may be used for processing requests from mobile devices.

A mobile device 20 communicates with an ADS-B module 10. Mobile application software 68 running on the mobile device 20 needs access to data stored on the ADS-B module 10. Driver software 62 hosted on the mobile device 20 interfaces with the mobile application software 68 and sees the need for data. The driver software 62 then transmits a request over wireless connection 50A to the ADS-B module 10.

In the ADS-B module 10, a message processing layer 60 first detects and interprets any requests coming into the ADS-B module 10 for stored data. This layer must understand the protocols used for communication between the ADS-B module 10 and the mobile device 20 as well as the format of the messages sent. Once the messages are understood, any requests for data are passed along to the application layer 64, which is the software layer responsible for handling the incoming requests. The application layer 64 processes the request and formats the data, if necessary, which it retrieves from internal memory through the device layer 66, which controls the hardware (including the memory) for the ADS-B module 10.

FIG. 2 is a flowchart showing an example use of the ADS-B system wherein weather data stored in the ADS-B module is requested by a mobile device 20 once the mobile device 20 wakes up. When the mobile device 20 is in sleep mode or the ADS-B application running on the mobile device 20 is pushed into the background by another application, it may not be able to receive updates from the ADS-B module 10. This may mean that the ADS-B application running on the mobile device 20 may be out-of-date when it first wakes up or is brought into the foreground. This flowchart describes one example of how this situation might be handled by the present invention.

When following this chart, it is best to view it as showing two parallel paths, with the top row (beginning with Step 100) showing steps executing on or by the mobile device 20, and the bottom row (beginning with step 200) showing steps executing on or by the ADS-B module 10. The mobile device 20 and ADS-B module 10 act asynchronously from each other, and coordinate through the exchange of messages as needed.

The execution of the ADS-B module 10 is best viewed as a continuous loop. In Step 200, the ADS-B module 10 continuously receives updates (such as the weather products listed in Table 1) and stores them in non-volatile memory (a buffer) for later use. When the ADS-B module 10 receives a request 115 from the mobile device 20 in Step 210, the ADS-B module 10 interprets that request 115 and then transmits the requested data 215 to the mobile device 20. This behavior continues throughout the operation of the ADS-B module 10.

In Step 100, the mobile device 20 wakes up from sleep mode or is otherwise brought into the foreground where it can once again receive updates from the ADS-B module 10. In Step 110, the mobile device 20 determines that it has been asleep and so makes a request 115 to the ADS-B module 10 requesting the data it is missing since the last known update.

In Step 120, the requested data 215 is received by the mobile device 20 and is processed for display.

Figure 3:
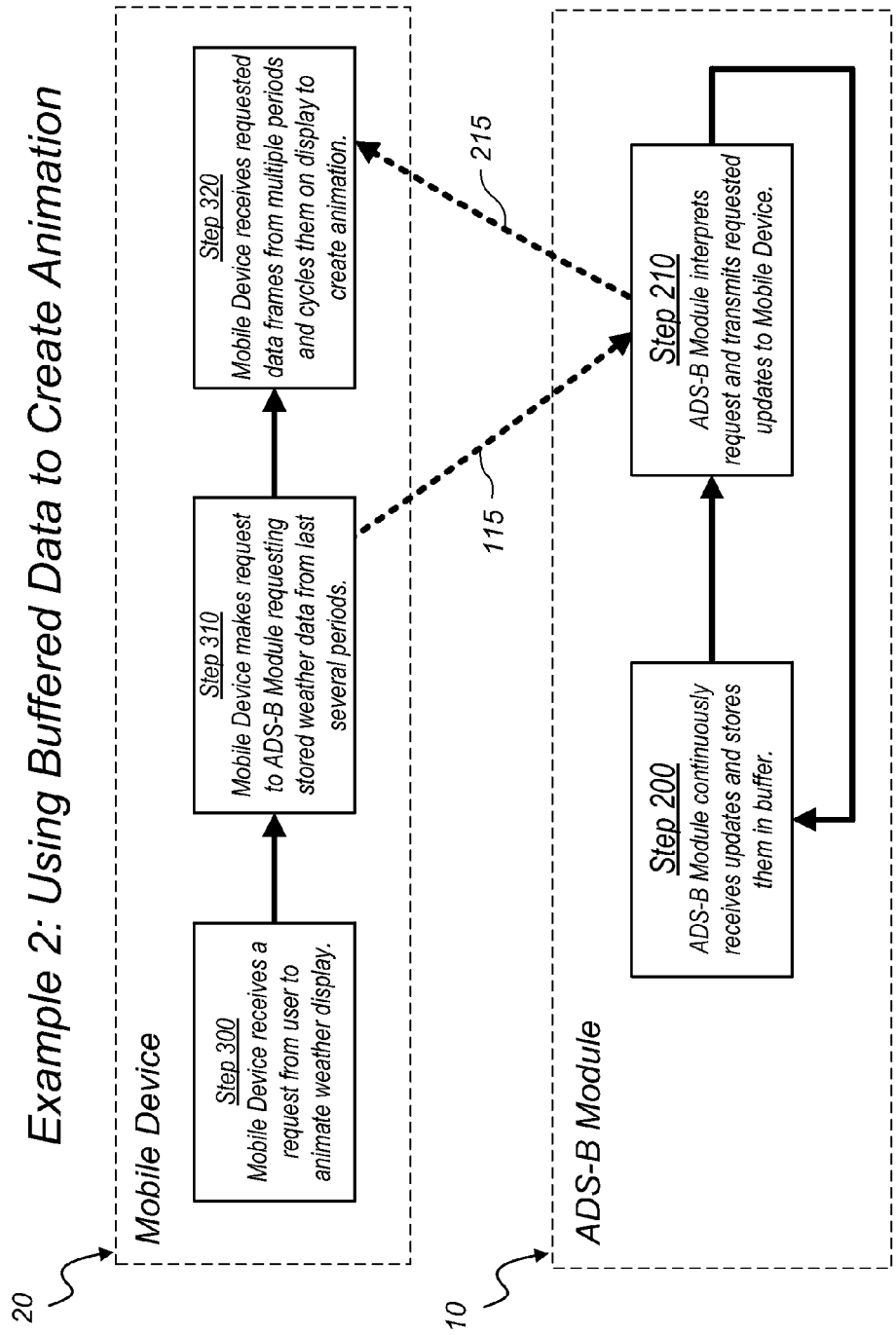
FIG. 3 is a flowchart showing a second example use of the ADS-B system wherein multiple generations of weather data stored in the ADS-B module is requested by a mobile device in order to create an animated weather display.

FIG. 3 is a flowchart showing a second example use of the ADS-B system wherein multiple generations of weather data stored in the ADS-B module are requested by a mobile device in order to create an animated weather display.

The behavior of the ADS-B module 10 in FIG. 3 is identical to the behavior of the ADS-B module 10 shown in FIG. 2, and so this behavior will not be described again. The behavior of the mobile device 20 is very similar to the example of FIG. 2, but the reason for requesting the data is slightly different and the use of the data is also different. Of course, the examples shown in FIGS. 2 and 3 can easily be combined into a single example, and obvious variations of these examples exist and would be obvious to one skilled in the art.

In Step 300, the mobile device 20 receives a request from a user to create an animated weather display. This may be in response to an interaction (a menu selection or button press) on the mobile device 20 screen. In Step 310, the mobile device 20 makes a request to the ADS-B module 10 requesting a specific number of updates from the last several update periods. For example, the mobile device 20 may request data from the last five weather update periods. The ADS-B module 10 sends the requested data 215, and, in Step 315, the mobile device 20 displays the updates in order as frames to create an animated weather display.

Alternate Embodiment, Software-Defined Radio.

Figure 4:
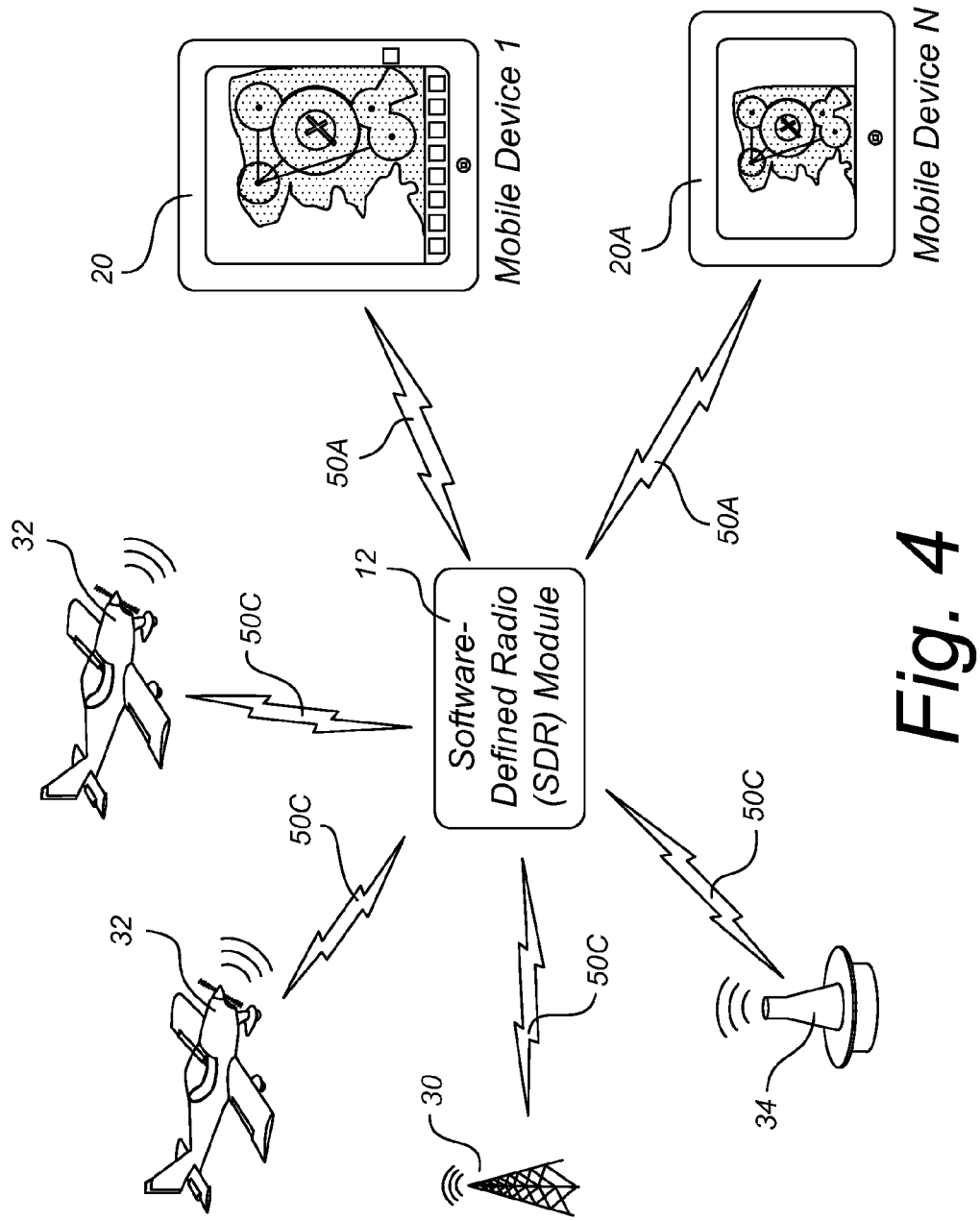
FIG. 4 is a block diagram of one embodiment of an electronic system capable of receiving data broadcast from multiple sources, specifically radio transmissions received on a pre-selected frequency, and caching that data for later playback and use.

FIG. 4 is a block diagram of one embodiment of an electronic system capable of receiving data broadcast from multiple sources, specifically radio transmissions received on a pre-selected frequency, and caching that data for later playback and use. In a sense, the system presented in FIG. 4 is simply an alternate embodiment of the system presented in FIG. 1A, and is thus not a separate invention. The sources of the transmitted data for the two systems may be different (FIG. 1A versus FIG. 4), but are not required to be. Instead of receiving transmissions of weather-related information 50B in FIG. 1A, the system of FIG. 4 receives radio frequency transmissions 50C. The embodiment of the present invention of FIG. 4 creates a software defined radio, as will be described in the following paragraphs regarding FIG. 4.

An electronic module called a software-defined radio, or SDR, module 12 receives radio transmissions 50C from a variety of sources. For the example shown in FIG. 4, the sources may include transmissions from a VOR beacon 34, an ADS-B ground station 30, or one or more aircraft 32. Of course, any of the three example sources shown if FIG. 4 (sources 30, 32, and 34) are meant to be representative only, and may not be present at all, or may be present in larger numbers. Also, there may be other sources of radio transmissions 50C. These other sources may include non-directional beacons (NDB), instrument landing systems (ILS), automatic terminal information services (ATIS), automatic weather information services (AWLS), automated weather observation systems (AWOS), automated surface observation systems (ASOS), meteorological information broadcasts (VOLMET), transcribed weather broadcasts (TWEB), distance measuring equipment (DME), or any other appropriate type of radio frequency broadcast.

Returning to FIG. 4 and the discussion of the software-defined radio embodiment of the present invention, one or more mobile devices 20/20A are used by a pilot on a flight. As previously discussed for FIG. 1A, the reference designator 20 is used to indicate a single mobile device, and 20A is used to indicate the optional presence of at least one other mobile device. Typically, there may only be one mobile device 20 being used with the system, but multiple devices can be supported. Hereinafter, any discussion of a mobile device 20 will be assumed to apply equally to one or more additional mobile devices 20A.

An application running on the mobile device 20 contains information on the mobile device's 20 current location, and, optionally, information on the flight plan being followed by the aircraft. Because the mobile device 20 knows where it is and may know where the pilot intents to fly the aircraft, the mobile device 20 can determine a list of radio frequencies which are used within a certain radius of the present location or which are located along the planned flight path. This list of radio frequencies can be transmitted over a wireless connection 50A to the SDR module 12. The SDR module 12 can then tune its radio receiver to one or more of the known frequencies and begin listening to those frequencies.

When the SDR module 12 detects a transmission on at least one of the frequencies given to it by the mobile device 20, it records the transmission and stores it in memory.

It should be noted at this point that the hardware configuration of the SDR module 12 may be identical to that of the embodiment of the present invention shown in FIG. 1B, accept that the ADS-B receiver circuitry 72 (from FIG. 1B) is more broadly defined to be a radio frequency receiver (not just ADS-B, but anything available and transmitted on an appropriate radio frequency).

A pilot often must try to listen to multiple sources of information when flying, especially when approaching a large airport. For example, a first pilot may tune his or her radio to listen to a specific radio frequency that is currently broadcasting a weather transmission when a second pilot in another plane makes a radio broadcast that is pertinent to the first pilot's situation. If the first pilot was listening to the weather report, he or she may have missed the broadcast by the second pilot all together.

It may also be that one or more other pilots are making transmissions that contain information of value to the first pilot, but which were missed by the first pilot. For instance, the first pilot may have his or her radio tuned to a frequency different from that of the frequency at which the one or more other pilots are making their transmissions.

Since the SDR module 12 is capable of listening to multiple frequencies of interest at once, it can detect and record these transmissions for later playback. A pilot can then use the mobile device 20 to select which of these transmissions to listen to, or can listen to all of them in turn. Additional detail and examples of specific radio frequencies relevant to a software-defined radio used in aviation are provided later in this specification.

Figure 5:
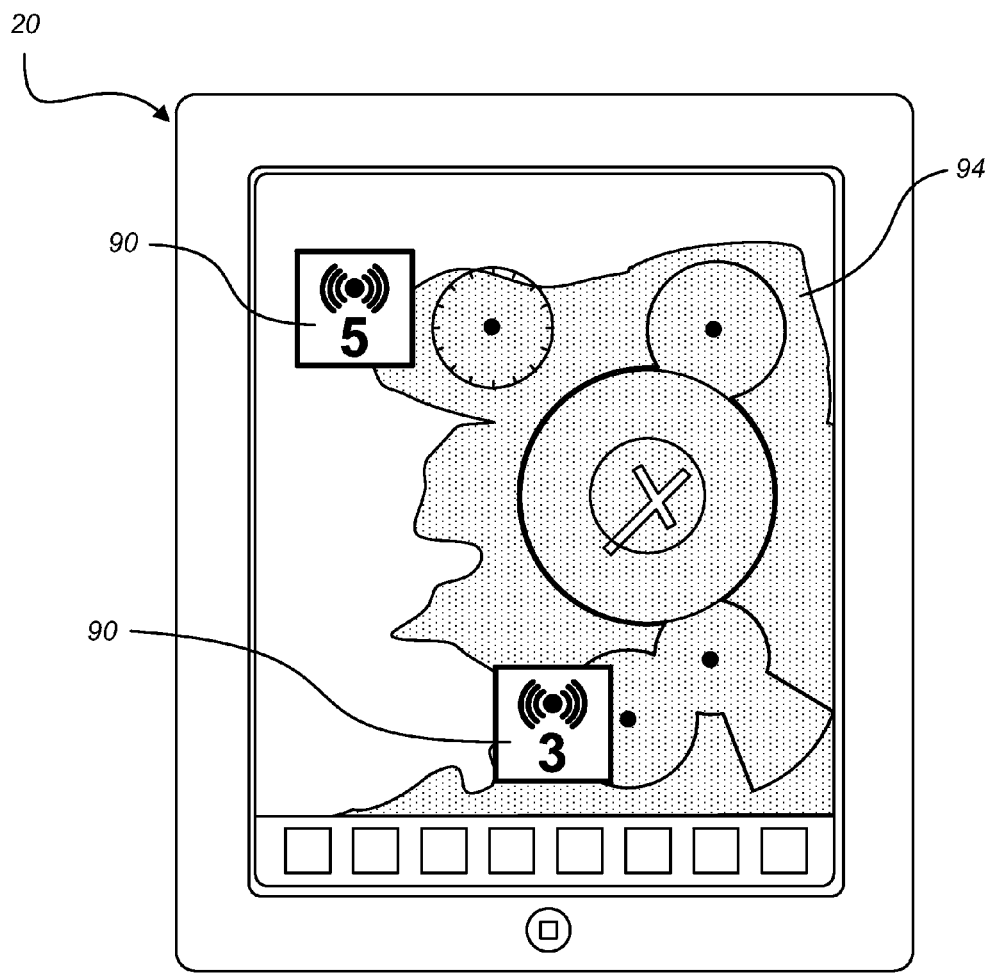
FIG. 5 is an illustration of a mobile device displaying aviation-related information, including graphics indicating the presence of one or more pre-recorded radio transmissions.

FIG. 5 is an illustration of a mobile device 20 displaying aviation-related information, including graphics indicating the presence of one or more pre-recorded radio transmissions. For example, an application presenting an electronic flight chart 94 may be displayed on the mobile device 20. This electronic flight chart 94 may include airport landing plates, VFR/IFR charts, moving maps, weather displays, or any other appropriate type of data related to the current flight or to a planned flight. When the SDR module 12 (FIG. 4) records one or more radio transmissions at one or more of the pre-determined frequencies of interest, it can communicate the presence of these transmissions to the mobile device 20 over the wireless connection 50A.

The existence of recorded radio transmissions may be displayed on the mobile device 20 using one or more graphical indicators 90. The embodiment of the graphical indicators 90 shown in FIG. 5 comprise an icon indicating a radio transmission has been recorded, and an integer number indicating the number of transmissions recorded for that frequency at a given time and location. For example, the graphical indicators 90 in FIG. 5 show that 5 transmissions were recorded at one location (the top most graphical indicator 90 in FIG. 5), and 3 transmissions were recorded at another location (the bottom most graphical indicator 90 in FIG. 5). In one embodiment, the pilot can tap one of the graphical indicators 90 to bring up a list of the recorded transmissions, to review them, and to play them back if desired.

The graphical indicators 90 may be displayed next to a representation of the location or source of the transmissions being recorded. For example, a graphical indicator 90 may be superimposed on top of a flight chart over the airport for whose frequency the transmissions were recorded.

The graphical indicators 90 represented in FIG. 5 (and again in FIG. 8, yet to be discussed) are provided as examples only, and the actual implementation and look of the graphical indicators 90 may vary from those shown. It is also likely that additional features and controls may be displayed to allow the pilot to dismiss or alter the display of the radio transmissions. Variations such of these are not important to the inventive concept presented herein.

Some specific examples of the use of the software-defined radio (SDR) of the present invention may aid in understanding. Although an SDR can be implemented such that is can listen to any radio frequency, one embodiment of relevance to the aviation industry would listen specifically to radio bands and frequencies specifically allocated to aviation. All pilots become very familiar with the very high frequency (VHF) band allocated to aviation, and in particular to the navigation (NAV) frequencies between 108 megahertz (MHz) and 117.95 MHz and the communication (COM) frequencies between 118 MHz and 136 MHz. By designing the SDR module so that is specifically listens to the NAV and COM frequencies, a very power flight tool can be created. An example embodiment of this tool is discussed in the following paragraphs and in FIGS. 6 through 8. Table 2 below presents a list of VHF frequencies allocated to the civilian aviation band (coving the NAV/COM frequencies used throughout aviation). Table 3 presents additional aviation-related VHF frequencies.

TABLE 2

The VHF 108 to 136 MHz Civil Aviation Band

| Frequencies | Allocation |
| --- | --- |
| 108.000-112.000 MHz | Aviation Terminal VOR and ILS Navigation (80 Channels) |
| 112.000-117.950 MHz | Aviation VOR Navigation (120 Channels) |
| 118.000-136.000 MHz | Aviation Communication (720 Channels) |
| 121.500 MHz | Aviation Distress |
| 121.600 MHz | Civil Air Patrol (Authorized use only) |
| 121.700 MHz | Aviation Ground Control |
| 118.000-121.400 MHz | Air Traffic Control (Towers and ARTCC's) |
| 121.600 MHz | Civil Air Patrol Training Beacons |
| 121.650 MHz | Aviation Ground Control |
| 121.700 MHz | Aviation Ground Control |
| 121.750 MHz | Aviation Ground Control |
| 121.775 MHz | Civil Air Patrol Training Beacons |
| 121.800 MHz | Aviation Ground Control |
| 121.850 MHz | Aviation Ground Control |
| 121.900 MHz | Aviation Ground Control |
| 121.900 MHz | Flight Schools |
| 121.957 MHz | Flight Service Stations |
| 122.000 MHz | Flight Advisory Service |
| 122.025-122.675 MHz | Flight Service Stations |
| 122.250 MHz | Balloons |
| 122.400 MHz | Flight Service Stations |
| 122.600 MHz | Flight Service Stations |
| 122.700 MHz | Aviation UNICOM Uncontrolled Airports |
| 122.725 MHz | Aviation UNICOM Private Airports |
| 122.750 MHz | Aviation Air to Air Communications |
| 122.775 MHz | Air Shows & Air-to-air Communications |
| 122.800 MHz | Aviation UNICOM Uncontrolled Airports |
| 122.825 MHz | ARINC |
| 122.850 MHz | Aviation Multicom |
| 122.875 MHz | ARINC |
| 122.900 MHz | Aviation UNICOM Uncontrolled Airports and Search and Rescue |
| 122.925 MHz | Aviation UNICOM/Multicom/Air Shows |
| 122.950 MHz | Aviation UNICOM Controlled Airports |
| 122.975 MHz | Aviation UNICOM |
| 122.975 MHz | Airplane to Airplane (high altitude airliners) |
| 123.325 MHz | Air Shows |
| 123.350 MHz | NASA |
| 123.400 MHz | Flight Schools |
| 123.425 MHz | Air Shows |
| 123.450 MHz | Air to Air (trans-ocean unofficial) |
| 123.475 MHz | U.S. Army Golden Knights |

TABLE 2-continued

The VHF 108 to 136 MHz Civil Aviation Band

| Frequencies | Allocation |
| --- | --- |
| 123.500 MHz | Flight Schools & Balloons |
| 123.525-123.575 MHz | Flight testing |
| 123.600-128.800 MHz | Air Traffic Control (Towers/ARTCC's) |
| 126.200 MHz | Military Airport Towers |
| 128.625 MHz | NASA/NOAA Research |
| 128.825-132.000 MHz | ARINC |
| 130.650 MHz | Military Airlift Command |
| 134.100 MHz | Military Airports - Ground Control Approach (GCA) Radar |
| 135.850 MHz | Federal Aviation Administration (FAA) |
| 135.950 MHz | Federal Aviation Administration (FAA) |

TABLE 3

Other Aviation-Related VHF Frequencies

| Frequency | Allocation |
| --- | --- |
| 136.000-136.975 MHz | Air Control/Unicom/Future Use |
| 148.125 MHz | Civil Air Patrol Repeaters - Secondary |
| 148.150 MHz | Civil Air Patrol Repeaters - Primary |
| 156.300 MHz | Aircraft-to-Ship - Safety |
| 156.400 MHz | Aircraft-to-Ship - Commercial |
| 156.425 MHz | Aircraft-to-Ship - Non-Commercial |
| 156.450 MHz | Aircraft-to-Ship - Commercial |
| 156.625 MHz | Aircraft-to-Ship - Non-Commercial |
| 156.690 MHz | Aircraft-to-Ship - Commercial |

Figure 6:
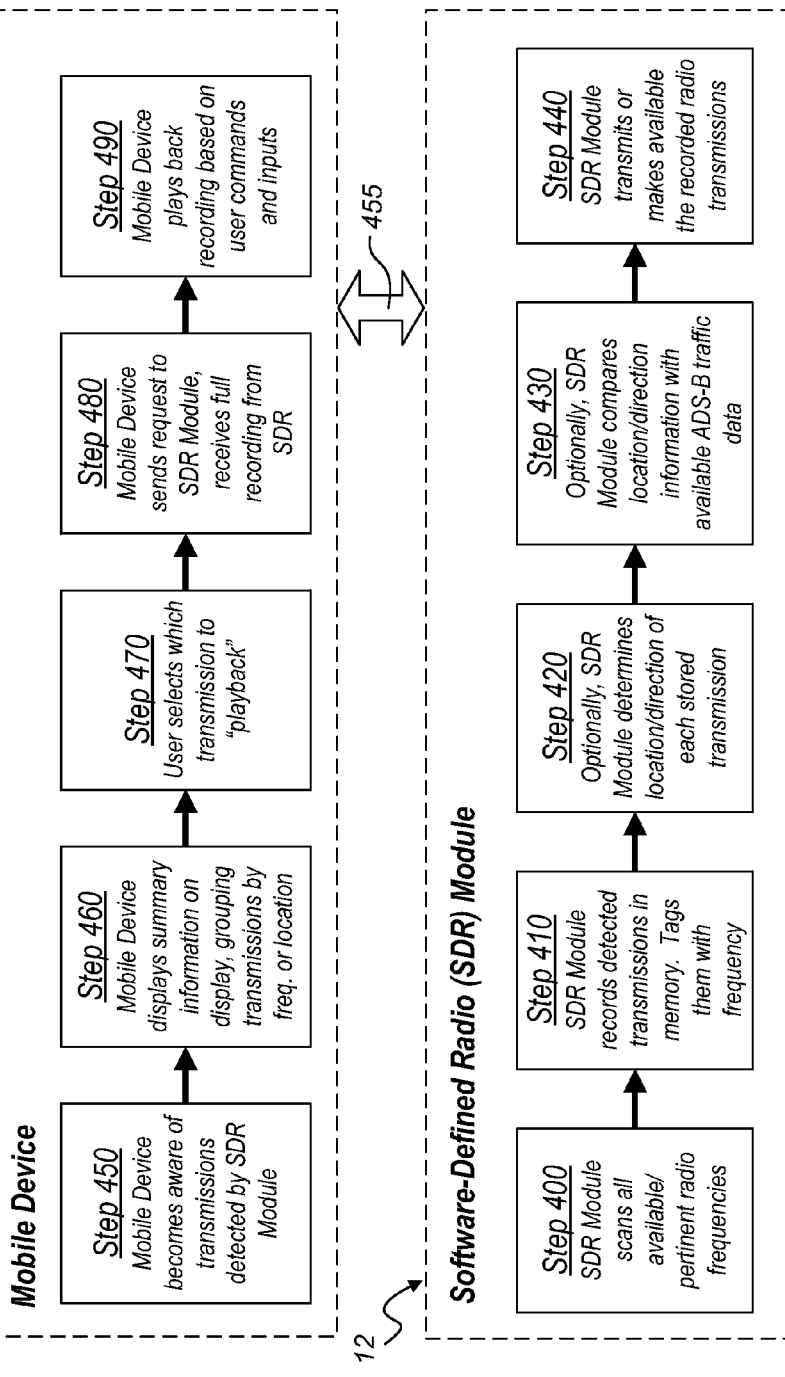
FIG. 6 is a flowchart showing how the present invention may be used to detect and record radio transmissions from objects transmitting in a region, and display the recorded messages for playback on a mobile device.

With the frequencies of Tables 2 and 3 in mind, we turn now to FIG. 6. FIG. 6 is a flowchart showing how the present invention may be used to detect and record radio transmissions from objects transmitting in a geographical region, and display the recorded messages for playback on a mobile device. The functionality of this embodiment is divided primarily between two separate but related devices, the SDR module and a mobile device functioning as a computing device and display. A dashed line representing each of these devices is drawn around the functional blocks performed by that device.

The SDR module 12 scans the spectrum of available and/or pertinent radio frequencies trying to detect any transmissions made on those frequencies (Step 400). In one embodiment, the SDR module 12 will simply scan all radio frequencies between a pre-programmed or pre-selected band of frequencies, such as between 108 and 136 MHz, the frequency band of interest to general aviation. In an alternate embodiment, the SDR module may query the mobile device 20 over a communications pathway 455 (a standard wireless communications pathway, such as an 802.11 connection or a connection using any appropriate wireless protocol) for a list of relevant frequencies. The mobile device 20 typically has a location sensor, such as a GPS receiver, and may also have information on the pilot's flight plan. In this alternate embodiment, the mobile device 20 creates a list of only those frequencies of interest along the planned flight path, or based on its current geographical position. That is, a plane flying over Sioux Falls, S.D., may not care about the VOR frequency of an airport in Fairbanks, Ala., and so can eliminate that frequency from the list of relevant frequencies that are provided to the SDR module 12. This reduction in the frequency list may be necessary for the most efficient performance of the SDR module 12.

If the SDR module 12 detects any transmissions on the pertinent frequencies, it records those transmissions in memory for later use (Step 410). The recordings are tagged with information describing the frequency on which they were detected so that information on this recording can be properly displayed on the mobile device 20.

Steps 420 and 430 are optional steps performed by the SDR module 12. These steps provide additional functionality to the system but are not required for normal operation. In Step 420, the SDR module tries to determine the direction or specific geographic location of each transmission. Some transmissions, such as the signals from VOR beacons, contain information which tell the SDR module 12 which direction the VOR beacon lies from the point of transmission receipt. Other transmissions, such as COM radio signals from other aircraft, do not contain location information, and so the location needs to be determined (if the system is equipped to do so). One method of detecting a transmission's approximate location, or at least its direction of origin, is to equip the SDR system with a phased antenna array. A phased antenna array comprises two or more antennas separated by a known distance, and information can be obtained based on the timing of receipt of a radio transmission as it is received by the two antennas. Additional detail on this concept is explained in FIG. 7.

Returning now to FIG. 6 and optional Step 430, once the location or direction of a transmission is known, the SDR module 12 compares this approximate location/direction information to any information it has received on the ADS-B frequencies, to try to see if there is a specific aircraft, as detected by ADS-B, that lies in the general area of the transmission's location. If so, the SDR module 12 tags the transmission with the identity of the aircraft from the ADS-B data. For example, if the SDR module 12 determines it has received a COM transmission from an object located somewhere off to the south, and if, by looking at the ADS-B information, it determines there is only one aircraft in that direction, the SDR module 12 can assume the transmission came from that aircraft, and tag the transmission with the identity of the aircraft.

Finally, the SDR module 12 transmits or otherwise makes the transmissions available to the mobile device 20. This may be done in response to a request for data from the mobile device 20 sent over the communications pathway 455, or the SDR module 12 may simply transmit the information to the mobile device 20 whenever it is present. It should be noted that the transmitted information may be simply summarizing information (such as a table of detected transmissions, their frequencies, and, optionally, their locations), or it may be the full recorded transmissions, or portions thereof.

The mobile device 20 becomes aware that transmissions have been detected and recorded by the SDR module 12 (Step 450). This "awareness" may be in the form of detecting a message sent from the SDR module 12 announcing that it has received transmissions, or in response to a query from the mobile device 20 to the SDR module 12.

The mobile device 20 then prepares a table of summary information, containing the number of separate transmissions that were detected at a given frequency (and, potentially, at a given location) so this information can be displayed (Step 460). Once the information is displayed (perhaps as illustrated in FIG. 5, or, as yet to be discussed, FIG. 8) on the mobile device 20, the operator can interact with the display to select one or more transmissions to play back (Step 470). Based on this selection, the mobile device 20 sends a request to the SDR module 12 for the full recording, or the requested portion of the full recording (Step 480). This request goes to the SDR module 12 over communications pathway 455, and the requested transmission information is sent back to the mobile device 20 over the same pathway 455.

Finally, in Step 490, the mobile device 20 plays back the recording based on commands and/or inputs from the operator on the user interface. In other words, the mobile device 20 can be used by the operator to play back the recorded transmission(s) using controls on the screen, possibly media player style controls.

Figure 7:
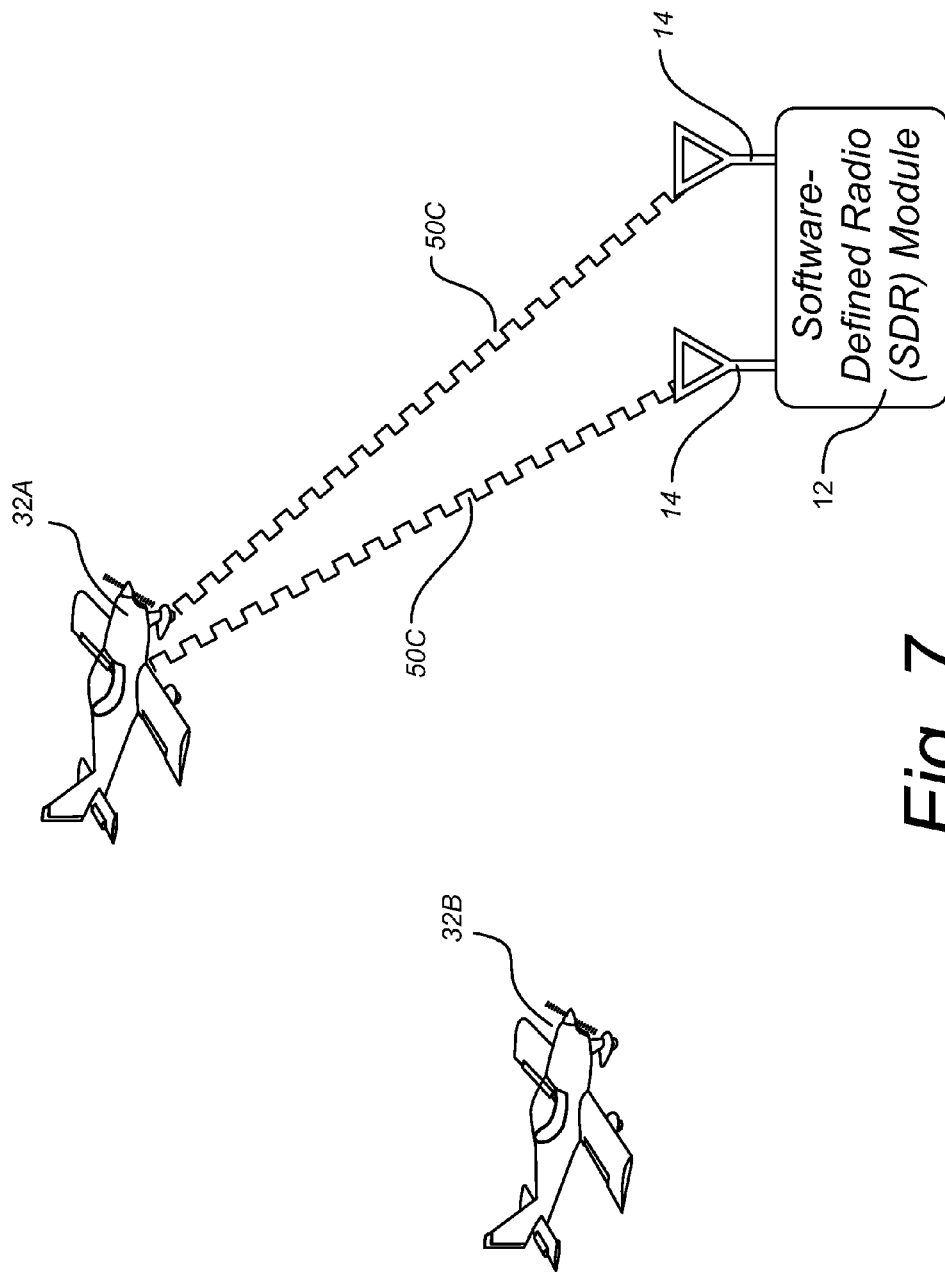
FIG. 7 shows how a phased antenna array can be used to determine the location of a transmitting object.

FIG. 7 shows how two or more antennas (or, alternately, a phased antenna array) can be used to determine the location of a transmitting object. The antennas 14 are separated by a known, fixed distance on the SDR module 12. A signal 50C broadcast by an aircraft 32A is received by the antennas 14. Because the antennas 14 are separated by a known and fixed distance, one antenna 14 will receive the signal 50C at a slightly different time than the other antenna 14, depending on the location of each antenna and the source of the transmission 50C. For instance, two antennas 14 are represented in FIG. 7, and each is receiving signal 50C from aircraft 32A. Each antenna 14 receives the exact same transmission 50C, but the antenna 14 shown on the left in FIG. 7 will receive the signal 50C a fraction of a second before the antenna 14 on the right, since the aircraft 32A is approaching from the direction closest to the antenna 14 on the left.

By measuring the difference in the time of receipt between the two (or more) antennas 14, a general direction can be determined for the source of the transmission. By having an array of antennas (with more than just two antennas 14), the SDR module 12 may even be able to calculate more than a general direction of the transmission, including an approximate geographic location of the source of the transmission. Aircraft 32B is shown in FIG. 7 to demonstrate that the SDR module 12 may be receiving multiple transmissions from multiple aircraft or other sources.

Figure 8:
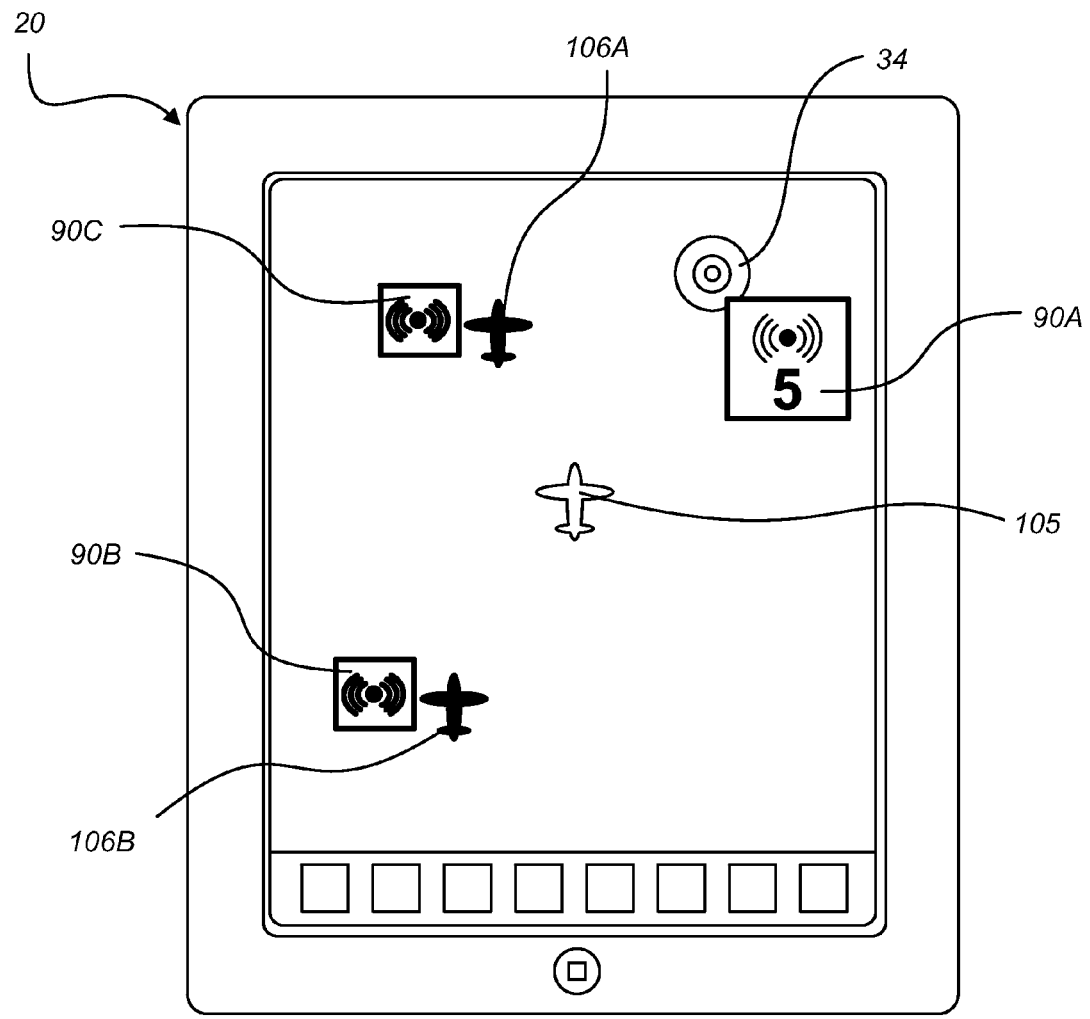
FIG. 8 is an illustration of a mobile device displaying aviation-related information, including graphics indicating the presence of pre-recorded radio transmissions, where the graphics are associated with a representation of the object doing the transmitting.

Finally, FIG. 8 is an illustration of a mobile device displaying aviation-related information, including graphics indicating the presence of pre-recorded radio transmissions, where the graphics are associated with a representation of the object doing the transmitting. FIG. 8 is an expansion of the illustration given in FIG. 5, given to better describe the potential functionality of the software-defined radio of the present invention.

In FIG. 8, the location information calculated by the SDR module 12, as discussed in FIGS. 6 and 7, is used to create a more useful graphical display of information to the pilot. A representation of the pilot's own aircraft 105 may be shown on the display of the mobile device 20. Other aircraft 106A and 106B may also be shown, positioned on the mobile device 20 such that their relative position to the pilot's aircraft 105 is obvious. If the SDR module 12 has determined that aircraft 106A has made a transmission, a graphical indicator 90C showing the presence of a single transmission may be displayed next to aircraft 106A. Similarly, a transmission associated with aircraft 106B might be indicated with graphical indicator 90B.

In some cases, multiple transmissions may be recorded from a single source over time. For example, as shown in FIG. 8, a VOR beacon 34 may be associated with 5 different transmissions over a period of time (for example, not meant to be limiting). The number of different transmissions detected over time may be display as shown, with a graphical indicator 90A showing the number 5 (for example) indicating the number of transmissions recorded for that object or for the given location.

Having described the preferred embodiment, it will become apparent that various modifications can be made without departing from the scope of the invention as defined in this document. In particular, although the examples and discussion presented herein dealt primarily with weather products and radio transmissions, any type of data broadcast by ground stations, other vehicles, or other sources can be archived by the electronic module of the present invention (as represented by the ADS-B module embodiment, component 10 of FIG. 1A, or the SDR module embodiment, component 12 of FIG. 4) and utilized as described.

Also, the examples presented describe the automatic detection and initiation of data requests to the module by application software on the mobile device based on certain conditions (such as a "wake-up" event, or a user request for an animated weather display or the replay of a radio broadcast), but many events could initiate this activity, including a specific action by a user, such as an "update data" request made from the iPad. Although this type of user-initiated update is not the primary intent of the described invention, it is nonetheless possible and is covered by the present invention.

Finally, the present invention can work for a system other than an aviation-related system, as the ADS-B or SDR module can be replaced with any appropriate kind of receiver or transmitter-receiver that is capable of receiving broadcast data of some form and of storing multiple generations of that data for future use.

The invention claimed is:

1. A transmission storing and display system comprising:
a mobile device; and
a receiver module comprising
   a radio frequency receiving circuit,
   a wireless communications means,
   a microprocessor, and
   an embedded software program, wherein the embedded software program executes on the microprocessor and controls the operation of the radio frequency receiving circuit and the wireless communication means;
  wherein the receiver module is configured for receiving data transmitted from one or more radio transmission sources and storing the data for future use, wherein the radio transmission sources are transmitting the data on one or more radio frequencies, wherein the radio frequency of each data transmission is stored along with the stored data, wherein the mobile device is configured for generating calls to the receiver module over the wireless communication means in order to access the stored data, wherein the receiver module is configured for sending the stored data over the wireless communication means to the mobile device for display or playback, and wherein the mobile device will display information relating to the stored data based on the radio frequency at which it was received; and
  wherein the radio frequency receiving circuit is designed to receive transmissions from one of: 1) an ADS-B system; and 2) in the frequency range of 108 MHz to 136 MHz.

2. The transmission storing and display system of claim 1 wherein the transmissions from the ADS-B system contain weather-related information, and the mobile device can receive two or more stored transmissions from the receiver module and display them in sequence to create an animated weather display.

3. The transmission storing and display system of claim 1 further comprising two or more antennas, wherein the radio frequency receiving circuit can compare the phase of a signal received on one antenna to the phase of the remaining antennas in order to calculate location information on the source of the signal.

* * * * *